2,774,742

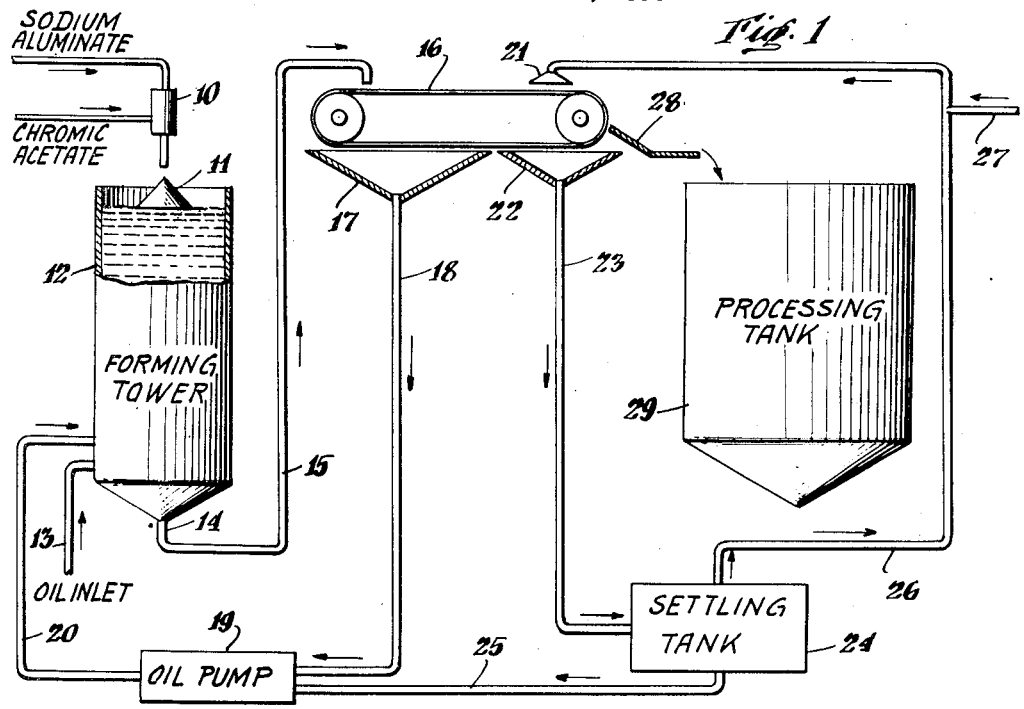
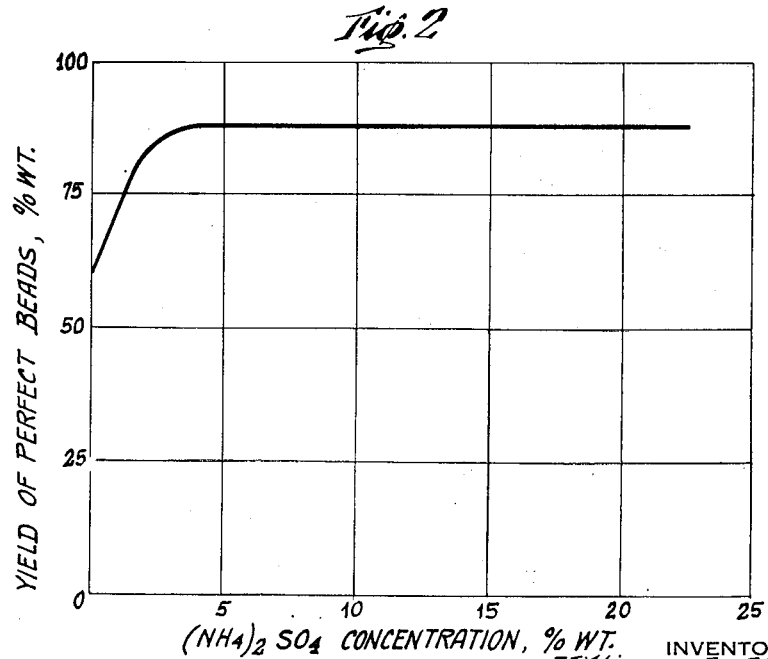

DEOILING OF SPHEROIDAL CHROMIA-ALUMINA HYDROGEL PARTICLES

William A. Stover, Pitman, and Robert C. Wilson, Jr., Woodbury, N. J., assignors to Socony Mobil Oil Company, Inc., a corporation of New York Application November 19, 1954, Serial No. 469,963

7 Claims. (Cl. 252—448)

This invention relates to an improvement in producing inorganic hydrogel particles in the form of spheroids. More particularly, the present invention is directed to an improvement in the manufacture of spheroidal particles of chromia-alumina cogelled catalyst useful in promoting hydrocarbon conversion operations.

It has heretofore been well known to prepare spherical hydrogel particles by dispersing or distributing a hydrosol in the form of globules, characterized by a rapid time of set, into a body of water-immiscible liquid where the hydrosol particles set to spheroidal particles of hydrogel. The hydrogel particles so formed are thereafter removed from the water-immiscible liquid, dried, and tempered to yield hard, bead-like gel particles either with or without subjecting the hydrogel after removal from the water-immiscible liquid to various intermediate treating steps such as hot water treatment, base exchange, washing, etc. The usual method for preparing such hydrogel particles has involved the injection of an inorganic oxide hydrosol of desired composition in the form of relatively small droplets or globules into a body of liquid which is substantially immiscible with water, the depth of said liquid and the gelation time of the sol being so correlated that gelation will occur while the sol is in the form of globules in the body of water-immiscible liquid. A common expedient has been to employ a liquid having a density less than that of water and overlying a body of water. In such instance, the hydrosol globules are introduced at the top of a tower containing such liquids and gel as they descend through the water-immiscible liquid. After gelation, they pass into the underlying water layer from which they are sluiced in a stream of water to another vessel for further processing. It has also been suggested to employ a liquid having a density greater than that of water and to introduce the hydrosol, in globular form, at the bottom of a tower containing such liquid so that the hydrosol particles set to hydrogel as they rise through the body of water-immiscible liquid. In such method, a layer of water usually overlies the body of water-immiscible liquid and the hydrogel particles are sluiced from this layer in a stream of water. The resultant hydrogel globules formed by either of the above methods of operation are washed free of the water-immiscible liquid, dried, and, if desired, calcined, it being understood, of course, that the hydrogel prior to drying may have been subjected to various treating steps well known in the art, such as hot water treatment, base exchange, washing, and the like.

Another suggested method of operation has been to employ a single liquid as the medium in which the hydrosol globules set to hydrogel and are thereafter sluiced in a stream from the forming tower. The specific gravity of such liquid is generally less than the specific gravity of the hydrosol, so that the globules of hydrosol injected at the top move downwardly through the body of liquid. When the globules have descended to the bottom of the liquid column, they are entrained by a stream of the same liquid and removed from the forming tower. The depth of liquid in the forming tower is sufficiently great that the globules of hydrosol set to hydrogel by the time they have descended through the column of liquid. The necessary height of the tower and column of liquid contained therein will vary, depending upon the setting time of the gel and upon the rate of descent of the globules through the suspending liquid. This rate of descent is controlled by the difference between the densities of the hydrosol globules and the suspending liquid, by the size of the globules, and by the viscosity of the suspending liquid.

The use of a single water-immiscible liquid as a forming medium and for sluicing the resulting hydrogel particles from the forming tower has been particularly desirable in instances where the suspending liquid necessarily has a specific gravity greater than that of water. Such suspending liquids are essential in imparting the desired spheroidal shape to hydrosol particles having a substantial product concentration, that is, gretaer than about 10 percent by weight. In the production of certain gel particles, it is advisable to maintain the freshly formed hydrogel out of contact with water. The use of a single water-immiscible liquid in the forming tower and for sluicing a stream of the formed particles therefrom has been employed with advantage in such cases.

In copending application Serial No. 201,537, filed December 14, 1950, of which the present application is a continuation-in-part, there is described, among other things, a process for preparing a cogelled catalytic composite of chromia and alumina having an inorganic oxide content of at least about 10 percent by weight. Such composite is suitably prepared in the form of spheroidal particles employing the above-described technique wherein a hydrosol is introduced into a water-immiscible liquid and the resulting formed particles of hydrogel are removed for further procesing in a stream of said liquid. The process has been set forth in detail in the aforementioned patent. For convenience herein, however, the following is offered as a brief description of said process.

A true all-embracing chromia-alumnia hydrogel having a metal oxide product concentration of at least about 10 percent by weight and a relatively short gelation time, i. e., less than 2 hours and preferably less than 60 seconds, is prepared by intimately admixing an organic chromium salt, such as chromic acetate, and an alkali metal aluminate, such as sodium aluminate, to produce a chromia-alumina hydrosol. The hydrosol so formed is permitted to set to a hydrogel. The resulting hydrogel is thereafter subjected to aging and then water-washed, dried, and calcined to yield a catalytic chromia-alumina composite. The relative proportions of chromia and alumnia may be varied over a wide range. The chromia content of such composites will generally be in the range of 20 to 50 weight percent of $Cr_2O_3$ and the alumina content in the range of 50 to 80 weight percent $Al_2O_3$. Preferably, the chromia content will be between about 30 and about 40 weight percent and the alumina content between about 60 and about 70 weight percent.

It is preferred, in preparing the above-described hydrogels, to use aqueous solutions of sodium aluminate and chromic acetate. Neither of these substances is a true chemical compound. The ratio of sodium to aluminum can be varied widely as can the ratio of acetate to chromum ion. Variation in the sodium to aluminum ratio of the aluminate solution requires compensating adjustment of the acetate to chromium ratio of the second solution in order to achieve satisfactory gelation. Hydrosols capable of setting to hydrogels in less than about 20 seconds are particularly desirable for the production of bead-like spheroidal particles by methods well known in the art, for example, those described in patents to Marisic, such as U. S. 2,384,946.

Quick setting hydrosols of low viscosity which can be readily handled at bead forming nozzles are those prepared from sodium aluminate solutions which have a sodium to aluminum mole ratio referred to as "R" of between 1 and 1.5. The acetate to chromium mole ratio in the chromic acetate solution employed should be not less than 2.8R–1.8 and not more than 4R–2.4 and preferably in the range of 4R–2.8 to 4R–2.4.

The control of the mole ratios discussed above is readily achieved in the manufacture of the reactant solutions. Chromium acetate is readily formed by reducing sodium dichromate with glycolic acid in the presence of acetic acid, as described more fully in U. S. 2,615,031, issued October 21, 1952.

Sodium aluminate is conveniently prepared from caustic soda of 50° Bé. and aluminum trihydrate. At a sodium to aluminum mole ratio in the range of 1.25/1 to 1.5/1, the sodium aluminate is advantageously manufactured in an open agitated kettle at 220–230° F. with a reaction time of 1 to 3 hours. Solutions having a lower mole ratio down to about 1.0/1 are made in an autoclave at 240–300° F. and 10 to 30 p. s. i. g. at the same reaction time. Sodium aluminate solutions having a low sodium to aluminum ratio less than 1.3 are relatively unstable and may be stabilized by the addition of organic materials such as glycerin, starch, sugar, and the like.

The chromia-alumina hydrogel having a short time of set and a high solids content generally between about 10 and about 30 percent by weight, may readily be prepared by controlling the sodium to aluminum mole ratio of the sodium aluminate solution employed and the acetate to chromium mole ratio of the chromic acetate solution. The specific ratios employed will depend upon the particular composition of the chromia-alumina hydrogel desired.

Temperature, pH, and product concentration are interrelated variables effecting gelation, and within the limits in which formation of hydrogels occurs, they control gelation time. In general, the other factors can be controlled to achieve gelation at any practical solution temperature. Thus, temperatures from 30° F. to 150° F. are suitable. Best gelation times are experienced at temperatures between about 120° and about 140° F. The pH of the chromia-alumina hydrogels is generally between about 10 and about 13. For bead formation, a pH of about 12 yields excellent results.

For the production of chromia-alumina hydrogel beads, a chromia-alumina hydrosol is prepared and introduced into a water-immiscible medium in which the introduced hydrosol sets in the form of globules to hydrogel. Thus, a chromic acetate solution and a sodium aluminate solution are contacted in a mixing nozzle and discharged onto the apex of a dividing cone from which a number of small streams flow into a column of water-immiscible liquid. The water-immiscible liquid generally, but not necessarily, is an oil or an oil-containing mixture. A particularly suitable water-immiscible liquid for the present purpose is a blend of kerosene, lubricating oil stock, and a halogenated hydrocarbon, the proportions of which may be adjusted to give a liquid of desired viscosity characteristics. The temperature of the water-immiscible liquid is desirably maintained constant by circulation through a heat exchanger outside the bead forming tower.

The freshly formed chromia-alumina hydrogel above described is subject to a loss of aluminum as sodium aluminate if immediately washed with water. This tends to weaken the hydrogel to such an extent that it disintegrates in the wash water. That adverse effect can be avoided by immediately treating the freshly formed hydrogel in a slightly alkaline aqueous medium. This is generally accomplished by bringing the freshly formed chromia-alumina hydrogel into contact with an aqueous solution capable of affording the requisite equilibrium pH. In a typical operation, the freshly formed hydrogel beads are sluiced out of the forming tower with the oil blend described above. The hydrogel beads are then separated from the oil and treated with an aqueous solution of ammonium sulfate. The solution is advantageously kept at a pH of 8.0 to 9.5 by the addition of sulfuric acid. It is advisable to maintain a solution of this type in contact with the freshly formed hydrogel for some time after formation, generally for at least about 2 hours and preferably 4 hours or longer. For example, the solution may be recirculated through the freshly formed hydrogel or otherwise maintained in contact therewith for a period of from about 2 to about 24 hours after forming in order to fix the alumina. Such treatment of the freshly formed hydrogel is designated herein as "aging."

After the aging treatment, the chromia-alumina hydrogel is washed free of soluble salts. The washed hydrogel can be satisfactorily dried in either superheated steam or heated air. The dried hydrogel is thereafter suitably tempered in an inert or reducing atmosphere at an elevated temperature to yield a catalytically active cogel of chromia-alumina.

In accordance with the procedure of the present invention, it has been found that removal of the water-immiscible medium from freshly formed spheroidal particles of the above chromia-alumina hydrogel prior to aging and the manner of accomplishing such removal is an important factor influencing the physical characteristics of the resultant chromia-alumina gel beads. Although a small amount of water-immiscible liquid, in which the hydrogel particles are formed and are subsequently removed in a stream thereof, penetrates the surface of the particles, the liquid, for the most part, clings to the surface of the formed particles as an adherent film. The removal of the adherent water-immiscible liquid from freshly formed chromia-alumina hydrogel particles is hereinafter referred to as deoiling, although it will be understood that such term is used in a broad sense and may include the removal of a water-immiscible liquid in which the hydrogel particles are formed other than an oil or an oil-containing mixture.

It has been found that deoiling of the freshly formed spheroidal chromia-alumina hydrogel particles is suitably effected prior to aging by flushing a moving bed of said particles with an aqueous ammonium salt solution having a pH of between about 8.0 and about 9.5 and containing at least about 5 percent by weight of said salt. Suitable ammonium salts include ammonium chloride, ammonium sulfate, ammonium nitrate, ammonium acetate, ammonium carbonate, and the like. The choice of a particular salt for the flushing solution is largely a matter of economics and, of the foregoing, ammonium sulfate is accorded preference. Generally, although not necessarily, the ammonium salt solution employed for deoiling the freshly formed chromia-alumina hydrogel particles will be the same as that contained in the subsequent aging operation.

It is an essential feature of the present process that the deoiling solution contain at least about 5 percent by weight of the ammonium salt. Water and ammonium salt solutions containing less than about 5 percent by weight of the salt, as will be evident from data presented hereinbelow, physically impair the structure of desired spheroidal chromia-alumina gel particles, resulting in a distinctly inferior product. In addition, deoiling with an ammonium salt solution of at least 5 percent by weight concentration affords a better quality product than deoiling with water, such product being characterized by superior resistance to crushing. Generally, an aqueous ammonium salt solution of from about 5 to about 20 percent by weight will be employed for deoiling. A solution having a concentration in the approximate range of 5 to 10 percent by weight of ammonium salt has afforded excellent results and accordingly is preferred.

The pH of the deoiling solution employed in accordance with the present process is between about 8.0 and about 9.5. A reduction in the pH of the ammonium salt solution below 8.0 has a deleterious effect on the physical strength of the resultant catalyst. Since the pH of the freshly formed chromia-alumina hydrogel is ordinarily above this range, generally being about 12, the pH of the deoiling solution is controlled within the range of 8.0 to 9.5 by the addition of an acid, usually a mineral acid, such as sulfuric acid, to the deoiling solution.

Deoiling is preferably carried out at a temperature of 90 to 110° F. The use of higher temperatures is generally to be avoided since a loss of ammonia is thereby encountered. The deoiling solution, after removal of oil therefrom by settling, centrifuging, or other feasible means, can be re-used with a sufficient make-up of salt and acid to achieve the essential concentration and pH.

The present technique of deoiling chromia-alumina hydrogel particles is particularly applicable for continuous treatment of a moving bed composed of one or more layers of the freshly formed particles. In such operation, the particles are removed from the forming tower in a stream of the water-immiscible liquid and conducted to a perforated belt conveyor. Initially, oil is permitted to drain from the particles and thereafter the particles on the perforated conveyor are flushed with the above-described deoiling solution, the residence time of the hydrogel beads on the belt being sufficient to remove substantially all of the oil therefrom. Generally, between about 1 and about 6 volumes of deoiling solution per volume of hydrogel beads per minute will be employed. The drained oil is suitably continuously returned to the forming tower together with oil removed from the spent deoiling solution. The deoiling solution is thereafter recycled for further use. The deoiled chromia-alumina hydrogel beads are discharged from the conveyor into a flume for sluicing to a processing tank wherein the particles are subjected to aging.

Figure 1 of the attached drawing shows, in diagrammatic form, a suitable system for accomplishing deoiling of spheroidal chromia-alumina hydrogel particles in accordance with the present invention.

Figure 2 of the drawing shows the effect of the concentration of ammonium salt solution used for deoiling on the quality of the finished product.

Referring more particularly to Figure 1, a mixing nozzle 10 into which are conducted aqueous streams of sodium aluminate and chromic acetate, is mounted over a conical divider 11 which is located near the surface of the water-immiscible liquid in forming tower 12. The colloidal solutions from which the hydrogel particles are formed are mixed and admitted through nozzle 10 to the top of the divider 11 which is fluted and which divides the stream of hydrosol into a plurality of smaller streams which enter the column of water-immiscible suspending liquid in tower 12 as small droplets. The surface of the divider is slightly curved to provide a steep pitch at the apex while the surface of the divider near the base approaches the horizontal. Due to the gradually changing pitch of the divided surface, the streams flow smoothly and at the bottom of the divider are introduced at a reduced velocity into the body of immiscible liquid. The length of the column of suspending liquid and the gelation time of the sols are so regulated that the droplets will gel before passing out of the forming tower. Suspending liquid is continuously supplied through inlet 13. The flow of suspending liquid carries the formed hydrogel particles out of the forming tower through outlet 14. The particles are then transported in a stream of the suspending oil through conduit 15 to a perforated endless belt conveyor 16 where deoiling of the particles is accomplished.

The conveyor belt is composed of two sections, i. e., a draining section and a flushing section. The hydrogel particles initially are conducted through the draining section wherein loosely held oil drains from the particles into collecting pan 17. The oil, so collected, thereafter passes through conduit 18 and is recycled to forming tower 12 by way of pump 19 and conduit 20. The hydrogel particles on the conveyor which have been drained of loosely held oil pass into the flushing section and there are flushed or sprayed with the above-described ammonium salt deoiling solution conducted through a spray 21. The resulting mixture of oil and ammonium salt solution is collected in pan 22 and thereafter flows through conduit 23 to settling tank 24. The oil contained in such mixture is removed from the lower portion of tank 24 and passes through conduit 25 to pump 19 and is then recycled through conduit 20 to forming tower 12. The ammonium salt solution separating in the upper portion of tank 24 is withdrawn through conduit 26 and recycled to spray 21 for further use in deoiling. Ammonium salt make-up and acid to achieve the necessary salt concentration and pH in the deoiling solution is introduced through inlet 27. The hydrogel beads, after being deoiled, are discharged from the conveyor belt into a flume 28 and are conducted to a processing tank 29 in which the hydrogel beads are subjected to aging.

The following example will serve to illustrate a typical operation employing the process of the invention without limiting the same:

Example

A chromia-alumina hydrogel was prepared from the following reactants:

*Solution A.*—Diluted sodium aluminate containing approximately 18.3 percent $Al_2O_3$, 14.4 percent $Na_2O$ and 67.3 percent $H_2O$.

*Solution B.*—Diluted chromic acetate prepared by rerduction of sodium dichromate with glycolic acid and containing approximately 26.0 percent $Cr(CH_3COO)_3$, 1.4 percent $Cr(OH)_3$, 2.3 percent $CH_3COONa$, 5.5 percent $(COONa)_2$, 0.6 percent $HCOONa$, 0.8 percent $CH_2OHCOONa$, and 63.4 percent $H_2O$.

Solutions A and B were pumped separately under pressure to an efficient mixing nozzle. The solutions were heated to 120°–125° F. and mixed in equal volumes at a rate of 1.06 gallons per minute. The resulting stream of hydrosol flowed over a divider into a column of an oil blend of halogenated hydrocarbons. The hydrosol set to beads of hydrogel and the resulting hydrogel beads were sluiced from the bottom of the forming tower in a stream of the oil blend and conducted to a perforated belt conveyor approximately 3 feet wide and 11 feet long, moving at a speed of about 3 feet per minute. The hydrogel beads with adherent oil were collected on the conveyor. The beads on the moving conveyor then passed through a draining section where the bulk of the oil was removed. The residence time in the draining section was about 2⅓ minutes. The beads on the moving conveyor were then passed through a flushing section for 1⅓ minutes. The remaining oil was removed from the beads by washing in the flushing section with approximately 30 gallons per minute of a 7 percent by weight aqueous solution of ammonium sulfate having an approximate pH of 8.5 and a temperature of about 100° F.

The resulting deoiled beads were discharged into a flume and sluiced to a wet processing tank where the beads were aged in a 20 percent by weight aqueous solution of ammonium sulfate. Since the pH of the aging solution rises as it flows through the fresh hydrogel beads, sulfuric acid was added in sufficient amount to maintain a pH of about 6.0. The bead hydrogel was aged in this solution for 24 hours, after which it was allowed to age an additional 8 hours without pH control. During this latter period, the pH of the aging solution rose from about 6.0 to about 9.5. After aging, the hydrogel was washed until a sulfate-free wash water was indicated.

The washed sulfate-free hydrogel had a product concentration of 18.3 percent by weight. The hydrogel was thereafter dried in 100 percent steam at 230°–235° F. for 7 hours before the temperature was gradually raised to 350° F. over a period of about 2 hours. The dried gel was then tempered by heating in a closed vessel to 1100° F. at the rate of 2½° F. per minute. The resulting gel contained 32 weight per cent $Cr_2O_3$ and 68 weight per cent $Al_2O_3$.

Operations similar to the above, wherein the freshly formed chromia-alumina hydrogel beads containing adherent oil were washed with deoiling solutions of varying concentrations of ammonium sulfate, were carried out. The whole beads obtained in each case were subjected to a crushing force of 40 pounds. The product of the yield of whole beads times the fraction of whole beads withstanding a crushing force of 40 pounds without breakage is designated as the yield of perfect beads. The yield of perfect beads obtained in operations where the concentration of aqueous ammonium sulfate solution employed for deoiling was varied over the range of 0 to 20 percent by weight is shown graphically in Figure 2 of the drawing.

From an examination of such figure, it is evident that the use of a deoiling solution containing at least about 5 percent by weight of the ammonium salt afforded a distinct improvement in the yield of perfect beads, establishing that deoiling with an ammonium salt solution affords a better quality product than beads which have been deoiled with water or very dilute solutions of the ammonium salt.

The process of this invention thus affords a commercially attractive method for removing adherent oil from chromia-alumina spheroidal hydrogel particles. In this regard, it may be noted that merely draining the oil-containing hydrogel particles without subsequent flushing with an ammonium salt solution has resulted in erratic yields of whole beads. Such operation, furthermore, has the disadvantage of introducing considerable oil not removed during draining into the wet processing tanks from which the oil would subsequently have to be recovered. Also, the use of organic solvents, such as naphtha, for deoiling is unattractive because a costly stripping operation would be necessary for solvent recovery. The use of ammonium salt solutions having a concentration in the approximate range of 5–20 percent by weight has, in accordance with the present invention, been found to afford an unexpectedly useful means for removing adherent oil from the hydrogel beads.

While certain details of the process described herein have been directed to the use of an ammonium sulfate deoiling solution, other ammonium salts, and particularly those of mineral acids, present in an aqueous solution in a concentration of at least about 5 percent by weight and having a pH in the range of 8.0 and 9.5 may likewise be employed. Accordingly, it is to be understood that the above description is merely illustrative of preferred embodiments of the invention, of which many variations may be made within the scope of the following claims by those skilled in the art without departing from the spirit thereof.

We claim:
1. In the production of chromia-alumina spheroidal gel particles prepared by mixing aqueous solutions of sodium aluminate and chromium acetate and controlling the sodium to aluminum ion ratio and the acetate to chromium ion ratio in said solutions to yield a hydrosol having a chromia-alumina content of at least about 10 percent by weight and characterized by an inherent capacity to set to a hydrogel upon lapse of a suitable period of time, admitting said sol in the form of separate globules to a body of a liquid substantially immiscible with water wherein the globules assume a spheroidal shape and set to hydrogel, aging, washing, and drying the spheroidal hydrogel, the improvement which comprises removing adherent substantially water-immiscible liquid from the freshly formed hydrogel particles after separation thereof from said body of liquid, but prior to said aging, by washing said particles with an aqueous ammonium salt solution having a pH of between about 8.0 and about 9.5 and an ammonium salt concentration of between about 5 and about 20 percent by weight.

2. In the production of chromia-alumina spheroidal gel particles prepared by mixing aqueous solutions of sodium aluminate and chromium acetate and controlling the sodium to aluminum ion ratio and the acetate to chromium ion ratio in said solutions to yield a hydrosol having a chromia-alumina content of at least about 10 percent by weight and characterized by an inherent capacity to set to a hydrogel upon lapse of a suitable period of time, admitting said sol in the form of separate globules to a body of a liquid substantially immiscible with water wherein the globules assume a spheroidal shape and set to hydrogel, aging, washing, and drying the spheroidal hydrogel, the improvement which comprises removing adherent substantially water-immiscible liquid from the freshly formed hydrogel particles after separation thereof from said body of liquid, but prior to said aging, by washing a moving bed of said particles with an aqueous ammonium mineral acid salt solution characterized by a pH of between about 8.0 and about 9.5 and an ammonium salt concentration of between about 5 and about 10 percent by weight.

3. In the production of chromia-alumina spheroidal gel particles prepared by mixing aqueous solutions of sodium aluminate and chromium acetate and controlling the sodium to aluminum ion ratio and the acetate to chromium ion ratio in said solutions to yield a hydrosol having a chromia-alumina content of at least about 10 percent by weight and characterized by an inherent capacity to set to a hydrogel upon lapse of a suitable period of time, admitting said sol in the form of separate globules to a body of a liquid substantially immiscible with water wherein the globules assume a spheroidal shape and set to hydrogel, aging, washing, and drying the spheroidal hydrogel, the improvement which comprises removing adherent substantially water-immiscible liquid from the freshly formed hydrogel particles after separation thereof from said body of liquid, but prior to said aging, by conducting said particles in a stream of said liquid to a perforated moving conveyor belt on which said particles are drained and thereafter flushed with between about 1 and about 6 volumes of an aqueous ammonium salt solution per volume of particles per minute, said ammonium salt soltution having a pH of between about 8.0 and about 9.5 and containing between about 5 and about 20 percent by weight of ammonium salt.

4. In the production of chromia-alumina spheroidal gel particles prepared by mixing aqueous solutions of sodium aluminate and chromium acetate and controlling the sodium to aluminum ion ratio and the acetate to chromium ion ratio in said solutions to yield a hydrosol having a chromia-alumina content of at least about 10 percent by weight and characterized by an inherent capacity to set to a hydrogel upon lapse of a suitable period of time, admitting said sol in the form of separate globules to a body of a liquid substantially immiscible with water wherein the globules assume a spheroidal shape and set to hydrogel, aging, washing, and drying the spheroidal hydrogel, the improvement which comprises removing substantially water-immiscible liquid from the freshly formed hydrogel particles after separation thereof from said body of liquid, but prior to said aging, by draining loosely held liquid from a moving bed of said particles and thereafter spraying the moving bed of particles with an aqueous ammonium salt solution having a pH of between about 8.0 and about 9.5 and an ammonium salt concentration of between about 5 and about 20 percent by weight.

5. In the production of chromia-alumina spheroidal gel particles prepared by mixing aqueous solutions of sodium aluminate and chromium acetate and controlling the sodium to aluminum ion ratio and the acetate to chromium ion ratio in said solutions to yield a hydrosol having a chromia-alumina content of at least about 10 percent by weight and characterized by an inherent capacity to set to a hydrogel upon lapse of a suitable period of time, admitting said sol in the form of separate globules to a body of a liquid substantially immiscible with water wherein the globules assume a spheroidal shape and set to hydrogel, aging, washing, and drying the spheroidal hydrogel, the improvement which comprises removing substantially water-immiscible liquid from the freshly formed hydrogel particles after separation thereof from said body of liquid, but prior to said aging, by draining loosely held liquid from a moving bed of said particles, recycling the liquid so drained to said body of liquid and thereafter spraying the moving bed of particles with an aqueous ammonium salt solution having a pH of between about 8.0 and about 9.5 and an ammonium salt concentration of between about 5 and about 20 percent by weight, separating the resulting mixture of liquid and aqueous ammonium salt solution, recycling said separated liquid to the aforesaid body of liquid and recycling the separated aqueous ammonium salt solution for use in said spraying.

6. The process of claim 1, wherein the ammonium salt is ammonium sulfate.

7. The process of claim 2, wherein the ammonium salt is ammonium sulfate.

References Cited in the file of this patent

UNITED STATES PATENTS

| | | |
|---|---|---|
| 2,635,082 | Smith | Apr. 14, 1953 |
| 2,669,547 | Shabaker | Feb. 16, 1954 |